Feb. 6, 1923.
G. I. KOHR
1,444,346
COMBINATION COOKING UTENSIL
FILED JUNE 14, 1922
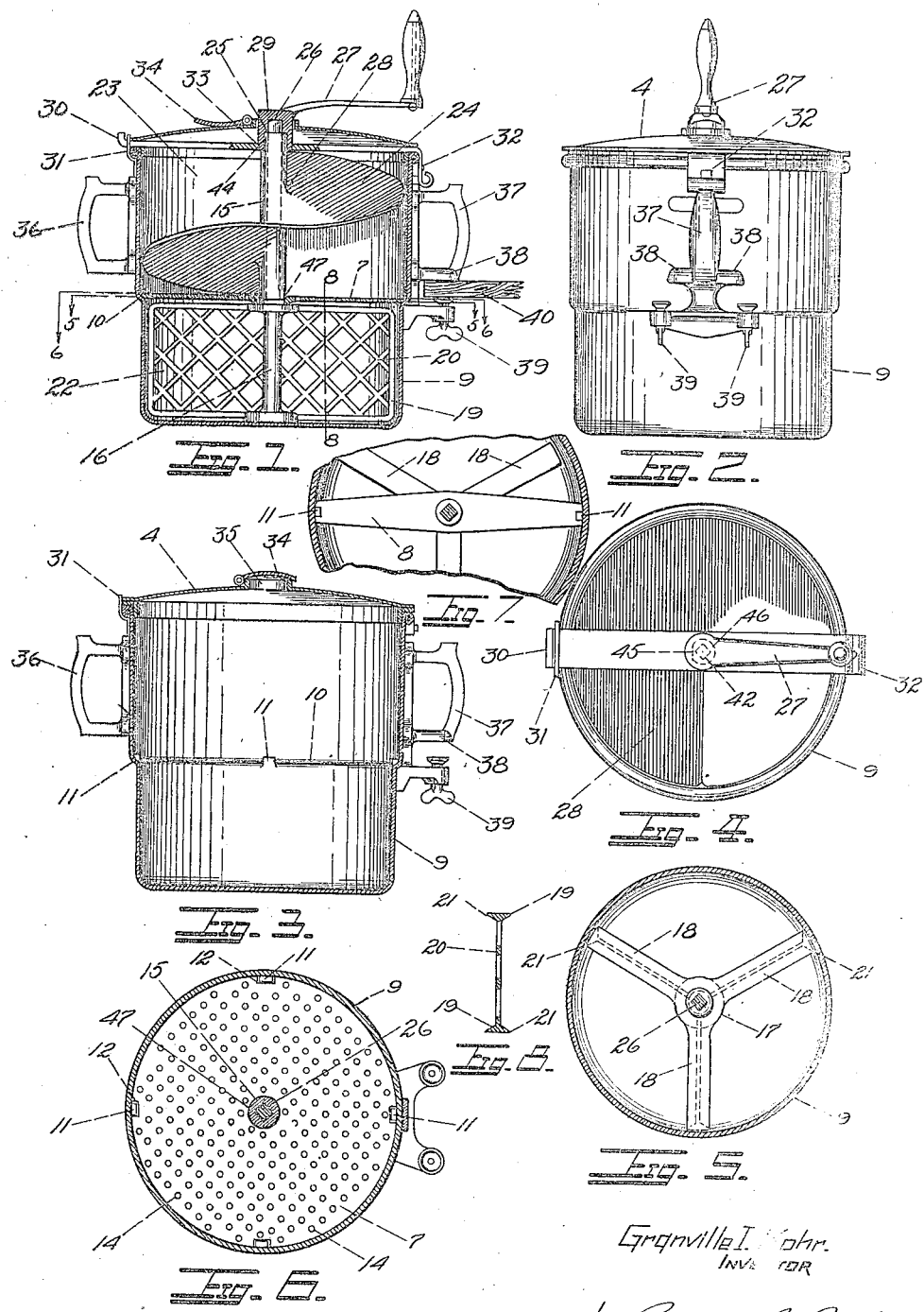
Granville I. Kohr
INVENTOR
by Bernard C. Becker
ATTORNEY Patented Feb. 6, 1923.

1,444,346

UNITED STATES PATENT OFFICE.

GRANVILLE I. KOHR, OF YORK, PENNSYLVANIA.

COMBINATION COOKING UTENSIL.

Application filed June 14, 1922. Serial No. 568,339.

*To all whom it may concern:*

Be it known that I, GRANVILLE I. KOHR, a citizen of the United States, residing at York, in the county of York and State of Pennsylvania, have invented new and useful Improvements in Combination Cooking Utensils, of which the following is a specification.

This invention relates to cooking utensils of the combination type.

The object of this invention is to provide a combination cooking utensil which has a wide range of usefulness, wherein a comparatively few parts are employed which may be arranged and reassembled to provide a number of different kinds of utensils useful in domestic cooking.

This invention will be more fully understood from the following description, taken in connection with the accompanying drawing, forming a part hereof, and in which similar numerals refer to similar parts throughout the several views.

Fig. 1, represents a vertical sectional view of my combination cooking utensil, and best represents a practical embodiment of my invention.

Fig. 2, is an exterior view of my cooking utensil.

Fig. 3, is substantially a reproduction of Fig. 1, with the internal parts removed.

Fig. 4, is a plan view of Fig. 2 with the cover 4 removed.

Fig. 5, is a sectional view of Fig. 1, taken on line 5—5.

Fig. 6, is a sectional view of Fig. 1, taken on line 6—6.

Fig. 7, represents a portion of a sectional view of Fig. 1, taken on line 6—6 but in which the screen 7 is substituted by the cross bar 8.

Fig. 8, is a sectional view taken on line 8—8 of Fig. 1.

With reference to the drawing, 9 is a hollow cylindrical casing, the lower end thereof being reduced in diameter to form the ridge 10. Supported on the ridge 10 is a screen 7 which is prevented from shifting and turning through the lugs 11; these lugs form a part of the casing 9 and fit into corresponding slots 12 in the screen 7. Through the screen 7 two chambers 22 and 23 are provided in the casing 9.

The screen 7 is composed of sheet metal, perforated as shown at 14. A hole 47 is formed in the screen to provide a bearing for the lower end of the feed screw hub 15 and the upper end of the beater hub 16.

The beater 17 consists of the hub 16, to which is fixed, through solder or otherwise, the three wings 18; each wing consisting of a frame structure 19 which carries the screen 20. The frame structure 19 is provided with sharp edges 21 to serve as scrapers to prevent food stuff from accumulating on the walls of the lower chamber 22.

The feed screw 28 consists of the spirally formed blade 24 and the hub 15. A square hole 25 is provided through the hub 15 which is adapted to receive the square shank 26 forming part of the beater 17. A hand crank 27 is provided through which rotary motion may be imparted to the feed screw 28 and beater 17. The hub 29 of the hand crank is adapted to engage both the end of the square shank 26 and the hub 15.

A cross bar 30 is supported on the top rim of the casing 9 and is held in place through being engaged with the eyepiece 31 and the spring latch 32. A hole 33 is formed in the cross bar 30 to provide a bearing for the crank hub 29 through which the upper end of the feed screw 28 and the square shank 26 is held steady while being rotated by the crank 27. A lid 34 is provided to close the opening 35 when the hand crank 27 is removed.

The handles 36 and 37 are fixed to the casing 9 through rivets (not shown) or in any suitable manner. The handle 37 is provided with flanges 38 and clamping screws 39 whereby the utensil may be fixed to the edge of a table or the like, the same being indicated at 40.

The important feature of my invention is that either the feed screw 28, or the beater 17 may be removed without destroying a complete workable device; and that the screen 7 may be substituted with the cross bar 8, thereby rendering this device operative without the screen. My special object is to provide a device having all these desirable features with the smallest number of parts and in which the number of pockets, crevices and ridges are reduced to a minimum, thereby producing a very sanitary device and one which is cheap to manufacture.

With this utensil assembled as shown in Fig. 1, it is particularly adapted for making mashed potatoes; for instance, the potatoes are placed in the chamber 23 during the boiling operation, and mashed by turning the hand crank 27, thereby rotating the feed screw 28. This forces the potatoes through the perforated screen 7 into the chamber 22 where the beater 17 stirs them into a creamy consistency.

The screen 7 may be removed and the cross bar 8 substituted therefor under which condition this device is adapted for a beater or agitator for liquid foods. When used for this purpose the feed screw 28 may be removed if the character of food would make it appear more appropriate.

For preparing certain characters of food it may be appropriate to eliminate the beater 17 only; or in other cases the feed screw 28 only.

To construct a broiler the feed screw 28 and the beater 17 would be removed, retaining the screen 7 only in the casing 9.

It is very apparent that all the internal parts may be removed retaining only the casing 9 and lid 4 as shown in Fig. 3 as a plain cooking utensil.

It is to be observed that the beater 17 and the feed screw 28 are independently driven by the crank 27, and that the elimination of one does not interfere with the driving of the other. This is apparent in Figs. 1 and 4 where it is shown how the square end of the shank 26 engages with the square hole 42 of the crank; also where the flat side 44 of the hub 15 engages with the flat side 45 of the hole 46 of the crank.

Having thus described my invention, what I claim, and desire to secure by United States Letters Patent is as follows:

1. In a combination cooking utensil comprising a cylindrical casing, the one end thereof being open, a lid for closing said open end, a screen in said casing adapted to form an upper and lower chamber, a beater in said lower chamber, a square shank fixed to said beater and extending vertically through said screen and said upper chamber, a spiral feed screw adapted to slide vertically on said square shank, (and a hand crank the hub thereof being adapted to engage both said spiral feed screw and the end of said square shank.

2. In a combination cooking utensil comprising a cylindrical casing the one end thereof being open, a lid for closing said open end, a screen in said casing adapted to form an upper and lower chamber, a beater in said lower chamber, a square shank fixed to said beater and extending vertically through said screen and said upper chamber, a spiral feed screw adapted to slide vertically on said square shank, a hand crank the hub thereof being adapted to engage both said spiral feed screw and the end of said square shank, a journal in said screen adapted to steady said beater and the lower end of said spiral feed screw, a cross bar between the upper edge of said cylindrical casing and said lid, and a journal in said cross bar adapted to steady the upper end of said spiral feed screw.

3. In a combination cooking utensil comprising a cylindrical casing the one end thereof being open, a lid for closing said open end, a beater in the bottom of said casing, a square shank fixed to said beater and extending vertically to the top of said casing, a spiral feed screw adapted to slide vertically on said square shank, a hand crank the hub thereof being adapted to engage both said spiral feed screw and the end of said square shank, a cross bar supported by said casing between said spiral feed screw and said beater, a journal in said cross bar adapted to steady said beater and the lower end of said spiral feed screw, a second cross bar between the upper edge of said cylindrical casing and said lid, and a journal in said second cross bar fitted to said crank hub and thereby adapted to steady the upper end of said spiral feed screw and said square shank.

In testimony whereof I affix my signature.

GRANVILLE I. KOHR.

Witnesses:
EDWARD P. CRAMER,
JEREMIAH CRAMER.